Figure 1:
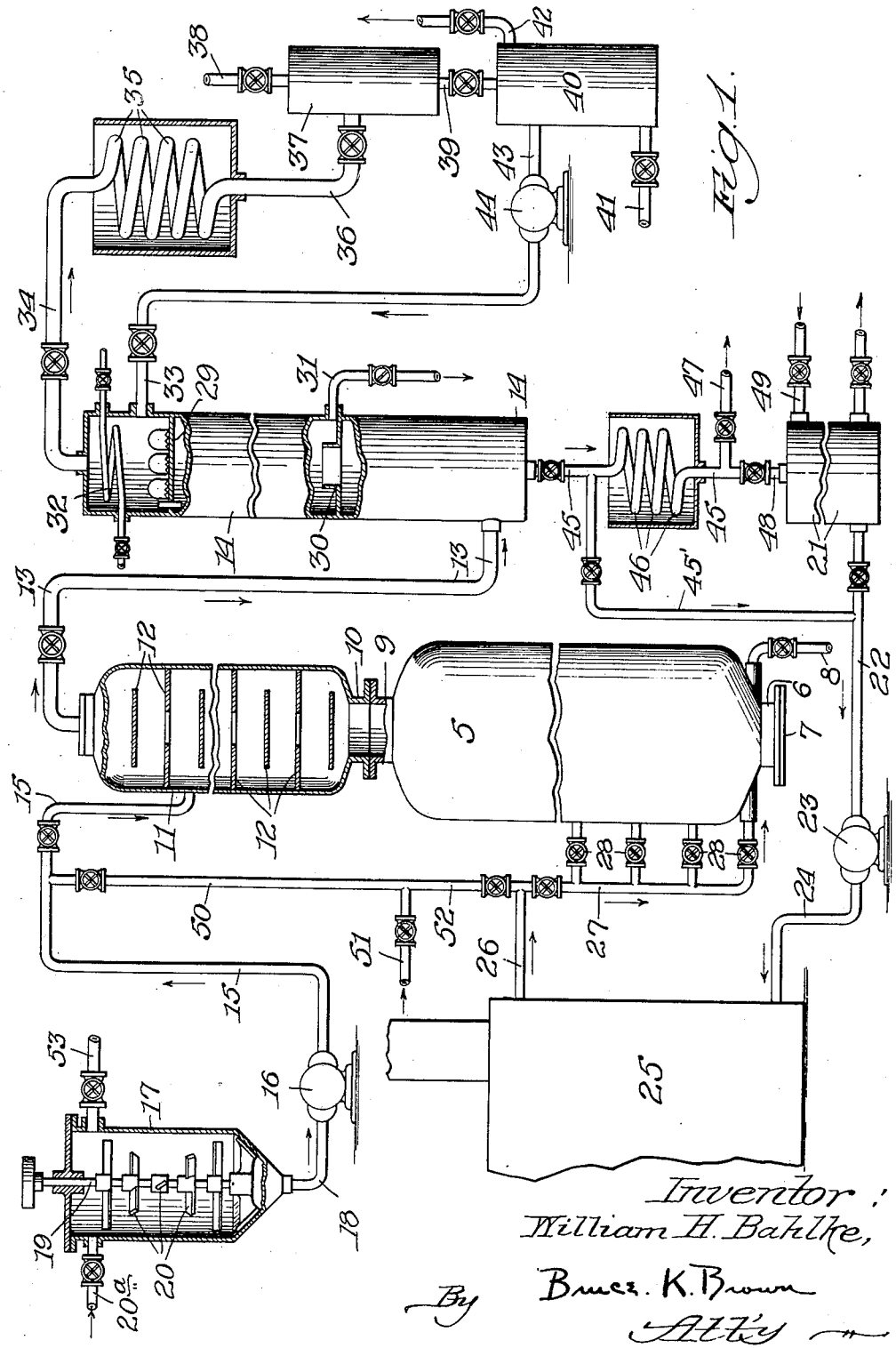

Sept. 7, 1937.  W. H. BAHLKE  2,092,200
TREATMENT OF ACID SLUDGE PRODUCTS
Filed June 30, 1932  2 Sheets-Sheet 1

Inventor:
William H. Bahlke,
By Bruce K. Brown
Atty

Patented Sept. 7, 1937

2,092,200

UNITED STATES PATENT OFFICE 2,092,200

TREATMENT OF ACID SLUDGE PRODUCTS

William H. Bahlke, Hammond, Ind., assignor to Standard Oil Company, Chicago, Ill., a corporation of Indiana Application June 30, 1932, Serial No. 620,221

2 Claims. (Cl. 196—50)

This invention relates to the production of valuable oil products and recovered acid products by decomposition of oil containing acid sludges resulting from acid treatment of mineral oils, particularly that type of acid sludge known as acid liver or acid coke which is capable of being separated on hydrolysis of the said sludge formed during treatment of viscous mineral oils with sulfuric acid. This invention also contemplates the decomposition into valuable oils of acid oil derived from said sludge products. More specifically stated, the invention is concerned with the decomposition of such acid sludge products for the production of low-boiling oils of the type suitable as motor fuel, and/or an oil suitable for fuel oil or charging stock for a cracking process wherein low-boiling oils suitable as motor fuel are produced, together with other products such as tar, coke, SO₂, etc.

Figure 2:
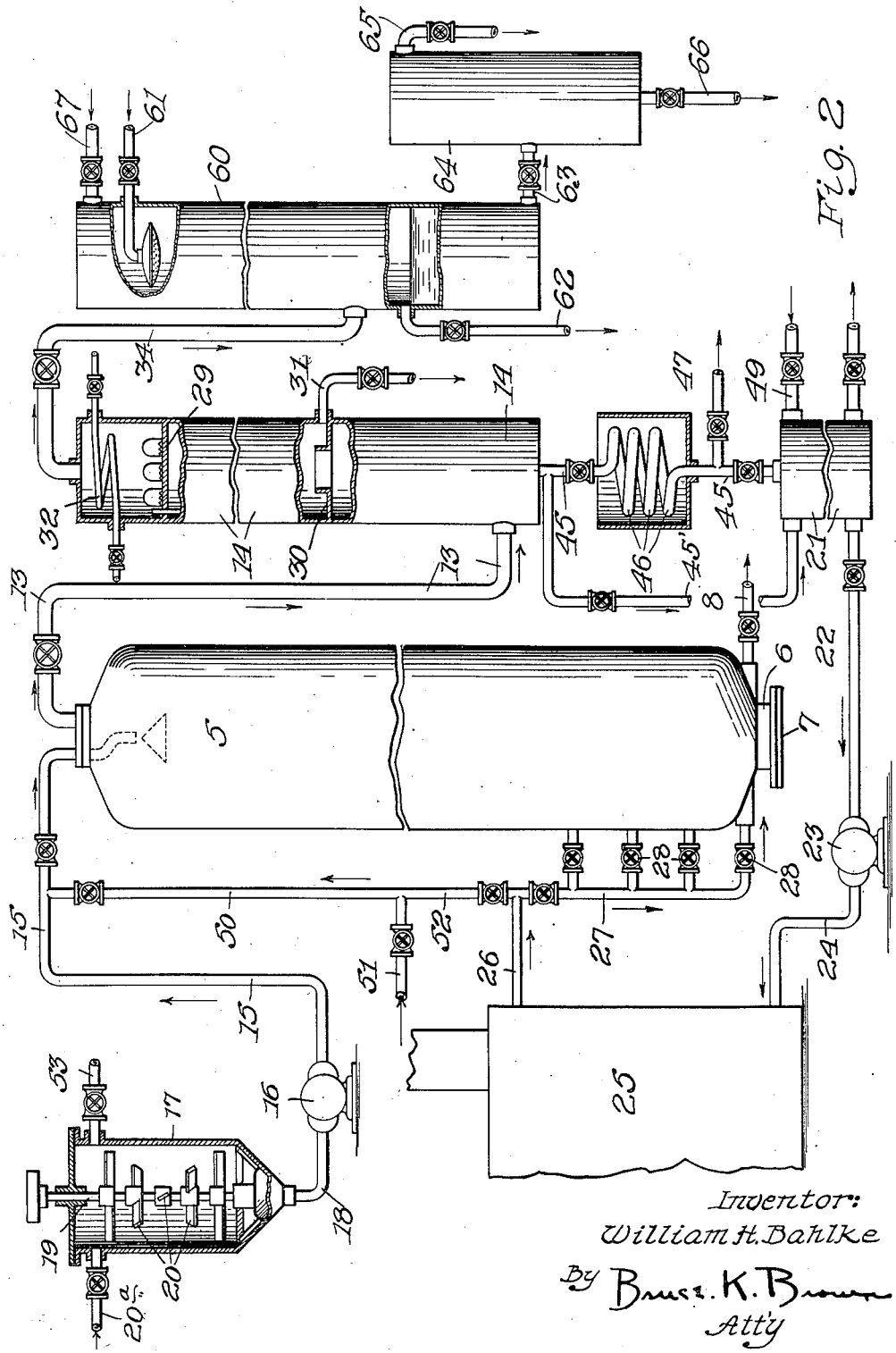

In general, two types of acid treatment are employed in the art, i. e. treatment with more or less strong sulfuric acid, and treatment with highly concentrated or fuming sulfuric acid. The acid sludges formed by these treatments contain the separable materials with which the present invention is concerned, i. e. acid liver, acid coke and acid-oil. Ordinarily these materials may be separated from the acid sludge by steaming the acid sludge, the acid liver and acid-oil separating as layers or strata. Thus, when acid sludge produced by treatment of heavy mineral oils with sulfuric acid is subjected to steaming or hydrolysis, the acid sludge on settling forms into three separate and distinct layers, the upper layer being an oil layer and known as acid oil, the lower layer consisting largely of acid and known as "sludge acid", and an intermediate layer containing carbonaceous material, sulfonated compounds, and acid, this layer being known as "acid liver". Sometimes this layer is further hydrolyzed with water to recover more acid. This hydrolysis produces also a hard material known as "acid coke". When the acid sludge produced by treating oils with highly concentrated or fuming sulfuric acid is hydrolyzed with water, two distinct layers are formed, the upper layer being largely sulfonated products and carbonaceous material and known as "oleum liver", and the lower layer consisting largely of acid known as "sludge acid". "Acid liver" or "acid coke" as here used, includes the acid sludge constituents containing sulfonated oil products, together with oily or carbonaceous materials, particularly acid liver or acid coke, oleum liver, and acid oil, or mixtures thereof, Little use has been made of these oil-containing acid sludge constituents in refinery practice and they have ordinarily been treated as waste products, being mainly used for fuel, although often without profit but merely as a means of disposal. The oleum liver derived from the acid sludge formed by the fuming sulfuric acid treatment has been subjected to special treatment for the removal therefrom of certain sulfonic compounds contained therein. The present invention is concerned with the treatment of these sulfonated oil-containing acid sludge constituents which are separable from acid sludge, and the acid sludge itself, for the purpose of securing products of commercial value, such as sulphur acids, oil products, such as fuel oil, gas oil, kerosene, gasoline, coke, etc. The invention will be fully understood from the following detailed description in conjunction with the accompanying drawings in which:

Figure 1 is a diagrammatic view, partly in section, of apparatus suitable for carrying the invention into effect, and Figure 2 is a similar view of a modified type of apparatus.

Referring more particularly to the drawings, the numeral 5 indicates a suitable decomposition or coking chamber, preferably lagged, and provided at its lower end with a large opening 6 for removal of coke, closed by a suitable manhead 7, and a valved draw-off line 8 for removal of heavy liquid residual products. The upper end of chamber 5 is provided with a relatively large opening 9 connected to the lower opening 10 of a flashing or vaporizing chamber 11, preferably positioned above the chamber 5. The chamber 11 is provided with suitable means for effecting vapor and liquid contact, for example, a plurality of disk and doughnut plates 12 may be provided therein.

The top of the chamber 11 is provided with a valved vapor outlet line 13, leading to the lower portion of a suitable fractionating column 14. A valved line 15 leading from a pump 16 is connected on the side and near the upper portion of chamber 11 for the introduction thereinto of acid liver separated from acid sludge. This material may be withdrawn from a suitable storage tank 17 through a line 18 leading to pump 16, by which it is forced through the line 15 into chamber 11. The tank 17 is preferably provided with means for effecting agitation of its contents, for example, a rotatable shaft 19 provided with a plurality of blades, or paddles 20, may be provided therein for this purpose. The tank 17 at its top may be provided with a line 20ᵃ through which the acid liver or coke may be supplied thereto from any suitable source.

From the tank 21, oil, preferably oil produced in coking the sludge products, is withdrawn through valved line 22 by pump 23 and discharged through line 24 to a pipe still furnace 25 wherein it is heated while passing in continuous flow through the pipes located therein. The heated oil leaves the pipe still through line 26 and enters the manifold 27, from which it is discharged through one of the valved inlet lines 28 into the chamber 5. These valved inlet lines are provided at different levels so that if a lower inlet pipe becomes clogged, the flow of heated oil and vapors may be diverted to an inlet at a higher level.

The column 14 is provided internally with suitable means for effecting intimate vapor-liquid contact, for example, a plurality of spaced bubble-cap plates 29 may be provided within the tower 14. At a suitable point in the column 14 above the point of connection of the vapor line 13, a suitable trap-out plate 30 is provided to permit the collection and removal from the column 14 of a distillate of the desired characteristics. Also several trap-out plates may be used in the lower part of column 14. A valved line 31 leads from the column 14 at a point immediately above the trap-out plate 30 through which distillate collected upon the plate 30 may be withdrawn from the column 14. The upper portion of the column 14 is provided with suitable cooling means, such as a coil 32 through which may be passed a suitable cooling fluid, or a line 33 may lead into the upper portion of the column 14 for the discharge of a relatively cool light oil thereinto. The top of column 14 is provided with a valved vapor draw off line 34 leading to a condenser coil 35. The condensate together with uncondensed gases or vapors is passed from the condenser 35 through a valved line 36 to a liquid-gas separator 37, wherein the condensate is separated from any gases or vapors, the latter being withdrawn through a valved line 38, and the condensate being withdrawn through valved line 39 and passed to separator drum 40, wherein any water admixed with the condensed oil is permitted to separate. The water is withdrawn from separator 40 through valved line 41 and the oil is withdrawn through valved line 42. If desired, a portion of the oil may be withdrawn through line 43 by a pump 44 and forced through the line 33 and into the upper portion of column 14, to effect cooling therein for fractionation.

The lower end of the column 14 is provided with a valved line 45 through which reflux condensate may be withdrawn from the column. The line 45 is provided with a cooling means, for example, a coil 46 may be interposed therein. The line 45 leads to a pair of valved branch lines 47 and 48, the latter leading to the storage tank 21, and the former (line 47) leading from the system. A valved line 45′ is connected to the line 45 at a point intermediate the tower 14 and the cooling coil 46 and leads to the line 22, whereby all or any portion of the condensate may be by-passed around the cooling coil 46 and discharged directly into the line 22 leading to the heater 25.

In carrying out the process of the present invention, the material to be treated, which may be acid liver separated from the acid sludge produced during the treatment of mineral lubricant oils by sulphuric acid, is supplied to the tank 17 through the line 20ᵃ. This material ordinarily contains a substantial amount of water, sulfonated oil compounds, oil and some acid. The material is more or less constantly agitated while in the tank and is introduced into chamber 11, through the line 15, and descends countercurrent to the hot vapors rising from the conversion or reaction chamber 5. The chamber 5 is, as hereinafter pointed out, maintained at about atmospheric, or superatmospheric pressure, say up to about 100 pounds and at a suitable reaction temperature, say from 700 to 900° F., or higher. When the sulfonated oil-containing material (acid liver or acid coke) is supplied to the chamber 11, the hot vapors come into direct contact with such material while it is flowing downwardly and an effective direct heat interchange is secured with rapid heating of the material being treated. The walls of the chamber 11 may be lined with corrosion resistant material, such as chromium, chromium alloy, ceramic material, or the like, although if a temperature of 600° F. or higher is maintained therein, such special lining is not required. By the heating action in chamber 11, the hot vapors remove volatilizable constituents including water from the acid liver fed into chamber 11, and its unvolatilized constituents are brought to a high temperature before passing downwardly through the connections 10 and 9 into the conversion or coking chamber to be heated to decomposing temperature and decomposed therein. Maintenance of decomposing temperature conditions in the chamber 5 is facilitated by this preliminary effective heating, and at the temperatures maintained therein, the material is substantially non-corrosive to the ferrous metals of which the reaction chamber would ordinarily be constructed.

It will be apparent that some heavy constituents and entrained tarry matter will be removed from the vapors rising from the decomposing chamber 5 by the entering material, and will be returned with the unvaporized constituents of the latter to the coking chamber for further treatment.

The vapors from the decomposing chamber 5, which include $SO_2$ and vapors of oils resulting from decomposition of sulfonated products in the sludge material, together with the vaporized constituents of the acid liver fed into chamber 11 are withdrawn from chamber 11 and are subjected to fractionation in the column 14 to condense and remove therefrom constituents heavier than the desired low-boiling products, the vapors of the latter passing out through the vapor line 34 for separate condensation in the condenser 35. The resulting condensate is passed to the gas separator 37 wherein uncondensible gas including $SO_2$ is separated therefrom, the gas being subjected to a scrubbing operation for removal of $SO_2$ therefrom. The separated condensate is passed to chamber 40 wherein any water is permitted to separate, the condensate being withdrawn through line 42 and the water through line 41. The water may be heated or stripped for removal of $SO_2$. A portion of the condensate may be recycled to the column 14 by means of lines 43 and 33, and pump 44, to serve as a reflux cooling fluid for the tower. However, all or any part of the cooling in column 14 may be effected by the passage of a suitable cooling fluid through the coil 32 therein. Condensate formed in that portion of the column above trap-out plate 30 may be collected thereon and removed through the line 31, as desired. The condensate formed in the column 14, and not withdrawn through line 31, is collected in the bottom of the column and removed through line 45 and passed through line 48 into the accumulator or supply tank 21, or directly into the line 22 by means of the line 45'. However, this condensate may also be diverted to line 47 and withdrawn from the system, as desired. Also, all or any portion of the condensate withdrawn from trap-out plate 30 may be passed to the tank 21. If desired, the condensate from column 14 may be all, or in part, passed from the system and suitable oil from any desired source supplied to tank 21 through valved line 49. The condensate withdrawn from the system through lines 31 and 47 may be used as gas or furnace oil, or as charging stock for a cracking system.

The oil in tank 21 preferably comprises condensate from column 14, and is withdrawn through line 22 by pump 23 and forced thru line 24 and pipe still in furnace 25 in which it is brought to a temperature of 750° F., or higher, under substantial superatmospheric pressure, say 100 lbs. or higher. The oil which is preferably a clean, completely vaporizable oil, in the kerosene or light gas oil range of boiling points, is passed through the still at a velocity sufficient to prevent deposition of coke therein, and with relatively slight cracking of the oil in its passage through the pipe still.

The hot oil products are discharged into the coking chamber 5 through one of the valved inlet lines 28, pressure being reduced thereon (if necessary) to atmospheric or low superatmospheric, say up to 100 lbs. A suitable coking temperature, say at least 750° F., is maintained in the chamber 5 and the unvaporized and tarry constituents of the oil passed through the pipe still, as well as the residual constituents of the acid liver received from the chamber 11, are decomposed in the chamber 5 to a substantially dry coke. The vaporized products from the pipe still as well as the vapor products formed by the reaction in chamber 5 pass upwardly into the chamber 11 for further treatment, as hereinbefore set forth.

The conditions which are maintained in the pipe still may be varied in accordance with the character of oil put through the pipe still and with the character of cracking it is desired to effect. For example, condensate oil having an end point of about 750° F. may be withdrawn from the column 14 through the line 45 and, in passage through the pipe still, brought to a temperature of 850° to 950° F., say about 900° F., at a pressure of 150 to 500 lbs., say 200 lbs. Or, a kerosene-like product may be withdrawn from the column and passed to the pipe still under substantially similar conditions of temperature and pressure. It will be seen that all or part of the condensate formed in column 14 may be substituted by oil from another source and supplied through the line 49.

The highly heated products, most all of which are vaporized under these conditions, enter the decomposing chamber 5 in which a pressure below 100 lbs. and preferably around 50 lbs. gauge is maintained, the temperature therein being 800 to 920° F. Substantially complete decomposition of the residual materials, as well as any residual products of the oil from the pipe still, may be secured therein, and the vapors are passed into chamber 11 for contact with the entering fresh acid liver, as above set forth.

It may be desirable to preheat the acid liver before or during its introduction into the vaporizing chamber 11 with the view of reducing the consistency of the material so that foaming and puking within the chamber 11 will be substantially avoided. This may be accomplished by supplying heat to the material in tank 17, however it should not be heated above about 200° F. at this point. It is preferred to preheat the stock during its passage through the line 15 to a temperature sufficient to cause a substantial portion, if not all, of the aqueous portion thereof to separate as vapors immediately upon its introduction into the chamber 11. This may be accomplished by the introduction into the stream of material flowing through line 15, of a highly heated inert fluid through a line 50 connected to line 15, for example, superheated steam may be passed from a line 51 through the line 50, or a portion of the highly heated products from the pipe still may be passed into line 50 by means of a branch line 52 leading from the pipe still outlet line 26. In this way the acid liver may be substantially preheated so that substantially all corrosion inducing constituents thereof will immediately volatilize and separate therefrom upon the introduction of the material into the chamber 11. Thus, the operation may be so controlled that it is only necessary to employ corrosion resistant material in the feed line 15.

If the acid liver to be treated is heavy, it may be suspended in an oil stock such as pitch still residue, fuel oil, or other heavy residual oil, the resulting mixture being fed into the system. This suspension may be formed in any suitable manner, for example two or more tanks similar to the tank 17 may be employed, the oil and acid liver being fed through lines 20a and 53 to one of the tanks and admixed therein, while a previously formed mixture or suspension is being withdrawn from the other tank. Any suitable heavy oil, either a distillate or a residual stock may be so admixed with the material to be treated.

Under ordinary conditions more than sufficient feed stock for the pipe still is formed in the system. Any excess may be withdrawn through lines 31 and 47. The ratio of heated oil supplied to the conversion chamber 5, relative to the acid liver derived from acid sludge will vary, of course, upon the conditions of operation, and the particular stocks employed. Ordinarily, the amount of stock fed to the pipe still is several times greater than the amount of fresh acid liver supplied to chamber 11, for example, the volumetric ratio may vary from 5:1 to 10:1, more or less.

The condensate withdrawn at 41 comprises a gasoline containing distillate, and kerosene, gas and fuel oil distillate stocks are recovered in the tower 14. A good quality hard coke is formed in the chamber 5.

In a typical operation, an acid liver separated from sludge formed by sulfuric acid treatment of lubricant stock, and having a 25% water content and 5% free acid, on decomposition formed about 2.5% $SO_2$, 27% of a 450° F. end point distillate, about 8% of uncondensible gas, about 15% of a good grade of dry coke, and 19% of a 13 A. P. I. gravity tar. The $SO_2$ may be utilized for various purposes, for example, it may be formed into sulfuric acid by suitable treatment, such as the "contact process" or the "lead chamber process".

It is to be understood that the conditions of operation may be varied to the extent that a heavy residuum or tar may be produced in the chamber 5 instead of a coke, for example, such heavy liquid residuum may be produced with the inclusion of a larger proportion of heavy hydrocarbon oils in the sludge charged. Such tar or residuum may be continuously or intermittently withdrawn through the line 8.

While the process has been described more particularly in connection with acid liver, it is readily apparent that other sludge materials containing sulfonated oil products may be similarly handled, such as sludge oil, unhydrolized sludge, and the like.

The apparatus shown in Fig. 2 is similar to the aforedescribed apparatus shown in Fig. 1, the reaction chamber in the embodiment in Fig. 2 not being provided with a preheating chamber (as chamber 11 in Fig. 1) for the fresh sludge material, which is in this modification introduced directly into the upper end of the reaction chamber. Also a water spray condensing means is employed for condensing the vapors from the tower 14, instead of the coil 35, shown in Fig. 1. Similar reference characters indicate parts similar to those shown in Fig. 1, and already described herein, and the operation is substantially the same as the operation already described in connection with Fig. 1. The sludge material, which is preferably preheated, for example by admixing steam or a portion of the hot oil products from the pipe still during the passage of the acid liver through line 15, is introduced directly into the chamber 5 from line 15, and its volatile constituents are rapidly vaporized as it falls through the body of highly heated vapors therein, the unvolatilized portion of the sludge material collecting in the lower portion of the chamber 5 where it undergoes further decomposition by the heat from the highly heated oil introduced into the lower portion of the chamber 5 from the pipe still 25. The vapor products, including the vaporized constituents of the sludge material together with the vapor products of decomposition, are withdrawn from the upper end of the chamber 5 and are passed to the fractionating column 14. The vapors withdrawn from tower 14 are passed by line 34 into an intermediate point of a tower 60 into the upper end of which is introduced through a line 61 a suitable cool fluid immiscible with the oil products, such as water, whereby the condensible oil vapors are condensed and absorbable gaseous constituents of the vapors, including SO₂ are absorbed in the cool fluid or water. The condensed oil and the fluid containing the absorbed gaseous products collect and stratify in the lower portion of the tower 60, the oil condensate being withdrawn through a valved line 62, the water being withdrawn through a valved line 63 and passed to a chamber 64 maintained under a pressure substantially lower than that maintained in the tower 60, preferably atmospheric, more or less, whereby a substantial portion of the absorbed gases, including SO₂, are flashed and thereby separated from the water. The flashed gases are withdrawn from chamber 64 through a valved line 65 and the remaining liquid, or water, is withdrawn through a valved line 66. Uncondensed and unabsorbed vapors and/or gases are withdrawn from the upper portion of tower 60 through a valved line 67. The remainder of the operation is substantially identical to that already described in connection with Fig. 1, and hence it is believed unnecessary to describe the same. Substantially similar pressure and temperature conditions may be maintained throughout the process when carried out in the apparatus of Fig. 2, and similar products may be produced.

Although the invention has been described in connection with the details of specific examples thereof, it is not intended that such details shall be regarded as limitations upon the scope of the invention, except insofar as included in the accompanying claims.

I claim:

1. The method of effecting decomposition of carbonaceous acid sludge material containing acid, water, oils and acid reaction products formed in the treatment of mineral oils with sulfuric acid, which method comprises introducing said material at a temperature not higher than about 200° F. into the upper part of a stripping zone, passing said materials downwardly in said stripping zone countercurrent to the upward flow of hot gases from a cracking zone whereby said material is gradually heated to at least 700° F. and freed from water and corrosive acid substances, introducing the material thus freed from corrosive substances from said stripping zone to said cracking zone, separately heating a hydrocarbon oil to a temperature higher than that of the cracking zone and introducing the heated oil into said cracking zone to maintain cracking temperature therein and to convert said materials from the preheating zone into light hydrocarbons of the gasoline boiling range and cracked residues, the heated oil and products of the cracking reaction forming the hot gases used in the stripping zone, withdrawing cracked residues from the lower part of said cracking zone and separately recovering gasoline, hydrocarbons heavier than gasoline, and gases including sulfur dioxide from products leaving the upper end of the stripping zone.

2. The process of treating acid sludge containing oil and acidic constituents which comprises delivering the acid sludge into a heating zone, passing hot gases from a cracking zone into the heating zone in direct contact with the acid sludge to heat the same to a temperature of at least 700° F. and effect varporization of the oil and acidic constituents in the acid sludge, introducing the thus treated acid sludge into said cracking zone, separately heating a hydrocarbon oil to a temperature higher than that of the cracking zone and introducing the heated oil into said cracking zone to maintain a cracking temperature therein and to convert the treated acid sludge into light hydrocarbons of the gasoline boiling range and cracked residues, the heated oil and the products of the cracking reaction forming the hot gases used in the heating zone, withdrawing cracking residues from the lower part of said cracking zone and separately recovering gasoline and hydrocarbons heavier than gasoline from the products leaving the overhead from the heating zone.

WILLIAM H. BAHLKE.